March 10, 1925.

D. J. STRICKLAND

BRICK MACHINE

Filed May 3, 1922

D. J. STRICKLAND

BRICK MACHINE

Filed May 3, 1922

Inventor
D. J. Strickland
By
Hull Brock & West
Attys.

March 10, 1925.

D. J. STRICKLAND
BRICK MACHINE
Filed May 3, 1922

Inventor
D. J. Strickland
By
Attys.

March 10, 1925.

D. J. STRICKLAND

BRICK MACHINE

Filed May 3, 1922

Inventor
D. J. Strickland.
By
Attys.

Patented Mar. 10, 1925.

1,529,453

UNITED STATES PATENT OFFICE.

DAVID J. STRICKLAND, OF CLEVELAND, OHIO.

BRICK MACHINE.

Application filed May 3, 1922. Serial No. 558,100.

*To all whom it may concern:*

Be it known that I, DAVID J. STRICKLAND, a citizen of the United States, residing at Cleveland, in the county of Cuyahoga and State of Ohio, have invented a certain new and useful Improvement in Brick Machines, of which the following is a full, clear, and exact description, reference being had to the accompanying drawings.

This invention relates generally to brick machines and more particularly to one embodying a pug mill and plunger for forcing the clay into the molds and also in which the filled molds are emptied and returned to receive another charge of clay.

The present invention has for its object to provide an improved mechanism for placing the molds beneath the die, carrying said filled molds away from the dies, inverting them and discharging the molded bricks from the molds and carrying them off upon pallets, the empty molds being re-sanded, reversed and fed back to the machine to receive another charge.

The invention also has for its object to provide improved means for striking or knocking the molds so as to facilitate the removal of the bricks therefrom and the invention also has for its object to provide an improved form of sanding device and likewise novel forms of devices for reversing the molds in the first instance and turning them back to their receiving positions after having been re-sanded.

The invention also has for its object to provide certain improvements in connection with the various details of construction whereby surety of ease and operation is obtained.

With these various objects in view the invention consists in the various novel features of construction and in the manner of combining or arranging the same, all of which will be fully described hereinafter and set forth in the appended claims.

In the drawings forming a part of this specification

In the practical embodiment of my invention I employ a pug mill 1 having the shaft 2 journaled therein and which may be provided with any suitable type of stirring blades and working in the pug mill is the plunger 3 for the purpose of forcing the clay through the dies to the mold 4. The plunger is operated by any suitable mechanism. A table 5 is supported beneath the die for the purpose of supporting the mold while the same is being filled and after the mold is filled it is pushed forward by means of the carriage 6 operated by arms 7 connected thereto and which in turn are connected to the arms 8 attached to the oscillating shaft 9. As the sanded molds are pushed forwardly off of the end of the table 5 they are received upon the mold receiving fingers 10 arranged at the ends of the arms 11 which arms are mounted upon the oscillating shaft 12 which shaft is actuated by means of the cam arm 13 connected thereto and operated upon by the arm 14 carrying the roller 15 at its free end, said arm 14 being mounted upon the rock shaft 9 as most clearly shown and this rock shaft 9 has arms 16 connected to the opposite ends thereof, which arms 16 are in turn connected to the pitman 17 which in turn are connected to crank segments 18 mounted upon the shaft 19 and to which is also connected the pitman 20 for actuating the plunger of the pug mill. The pitman 17 is capable of adjustment with reference to the crank segment 18 so as to increase or decrease the amount of oscillation of the shaft 8. By rocking the shaft 8 the cam arm 13 is actuated and consequently the shaft 12, arms 11 and fingers 10, the fingers 10 being so spaced as to receive the filled mold thereon and during the lowering movement of the arms 11 and fingers 10 the filled mold is deposited upon the endless chains 21 which are inclined downwardly and rearwardly, there being an endless chain at each side and the arms 11 working up and down between the same deposit the filled mold upon said endless chains and the upper flight thereof traveling rearwardly carries the filled molds rearwardly and downwardly and in case the chains should sag I provide guides 22 comprising forwardly extending arms provided with oppositely curved flanges 23 against which the ends of the mold contact and are lifted up so as to be carried along to the guide arms 24, said guide arms 24 terminating at their rear ends in upwardly inclined portions 25 along which the molds are passed to a series of rollers 26 arranged in an inclined frame and travelling in parallel relation with the series of rollers 26 are the endless feed chains 27 having lugs 28 which engage the molds as they travel along the portion 25 and feed the same along the inclined roller way 26 and at the end of the inclined rolls 26 I provide another set of endless chains 29, said chains 29 passing around the sprockets 30 and 31 respectively arranged upon the shafts 30ª and 31ª respectively and these chains 29 also pass around sprockets 32 mounted upon a shaft 32ª and from which depends a weight 33 for the purpose of keeping the endless chains 29 taut, the shaft 32ª being mounted in the end of arms 32ᵇ extending from the shaft 30ª.

The endless feed chains 27 travel around the sprockets 34, 35 and 36, the sprocket 34 being placed at the rear and the filled molds as they are moved rearwardly and upwardly by the feed chain 27 over the rolls 26 are carried up by said chain 27 and held in place by the chains 29 and the pallet having been manually placed upon the filled mold the moment said mold was deposited upon the rearwardly moving chain 21 the mold, bricks and pallet are caused to travel rearwardly and upwardly and onto the horizontal guideways 37 and at the rear end of this horizontal guideway 37 there is provided a downwardly extending guide portion 37ª which engages the tapered and rabbeted end portion 4ª of the mold and guides the mold onto the horizontal guide members 37 while the pallet with the bricks thereon is continued along the upper flight of the endless chain 27 and by which said pallet is delivered to the inclined roller way 38 and lateral guide chute 39. The molds pass along the guideway 37 to the roller track 40 which may be slightly inclined and by means of which the empty and inverted molds are carried to the sanding device.

As the filled molds with the pallets thereon are carried upwardly and rearwardly over the rollers 26 the molds are knocked at their ends by means of the hammers 41 carried at the lower ends of the arms 42 pivoted at 43 from the frame member 44 and these depending knocker arms are actuated by means of a knocking cam 45 mounted upon the shaft 46 and these cams 45 and the dogs 47 arranged upon the arms are so positioned that the ends of the molds are alternately knocked so that bricks within the mold are given a lateral jar and as the molds pass along the horizontal guideway 37 and during which time the initial separation between the mold and pallet is taking place the molds are struck vertically upon their bottom by means of hammers 48 arranged at the ends of the arms 49 carried by the shaft 50, said shaft also carrying spring arms 51 actuated by cams 52 upon a shaft 53, the arms and cams being so positioned as to strike the mold at different times, at different places and effectually dislodge the bricks from the molds and as before stated the pallets with the bricks thereon course down the rollers 38 and chute 39 while the inverted and empty mold passes down the roller track 40.

Figure 1:
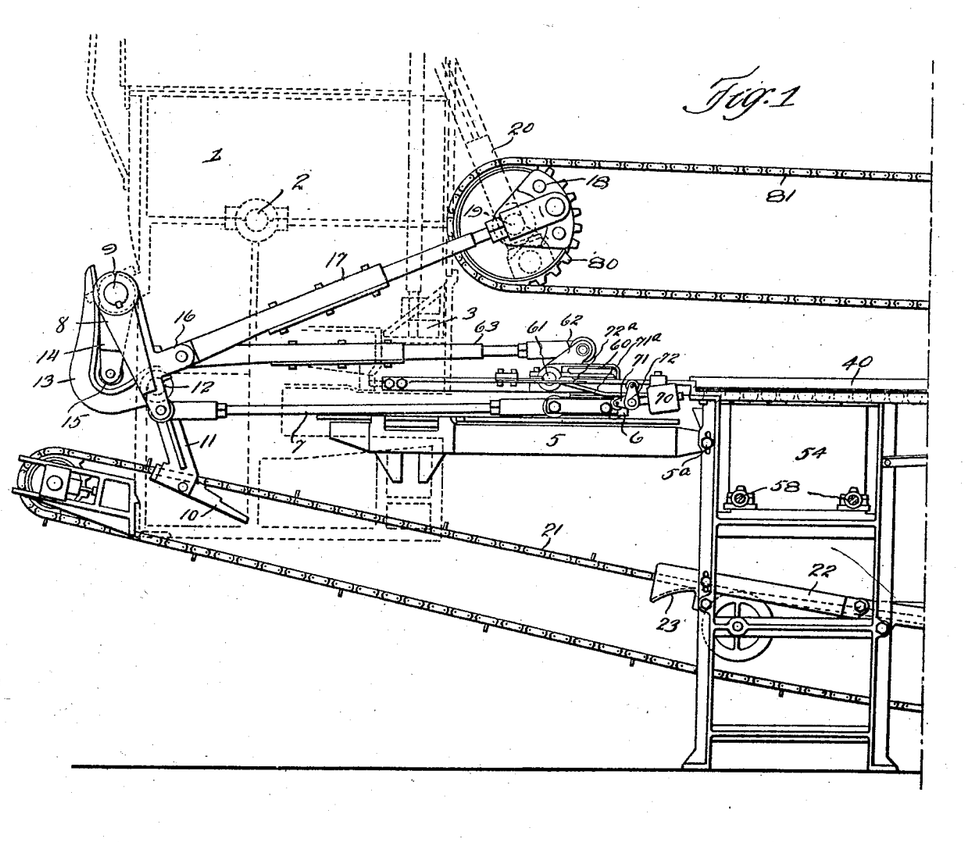
Fig. 1 is a view showing in side elevation the mechanism connected with the brick making machine for feeding the molds beneath the die and removing the filled molds and starting them upon their travel during which time they are knocked or agitated, emptied and returned to their original positions.
Figure 2:
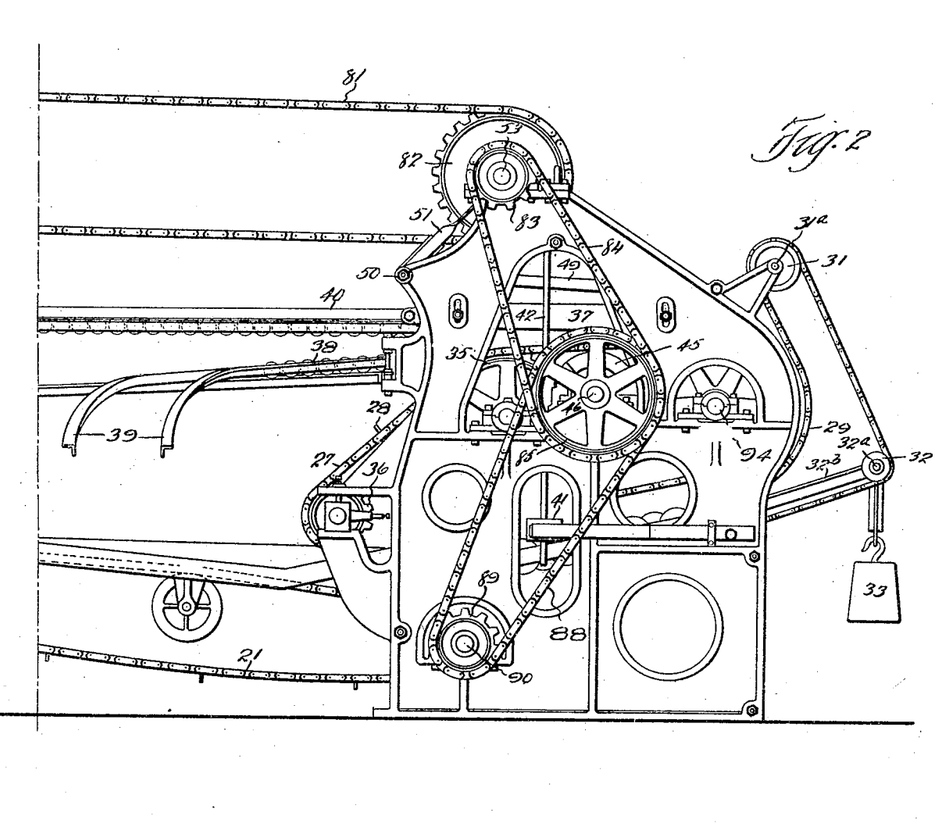
Fig. 2 is a view showing in side elevation the opposite end of the machine.
Figures 3, 23:
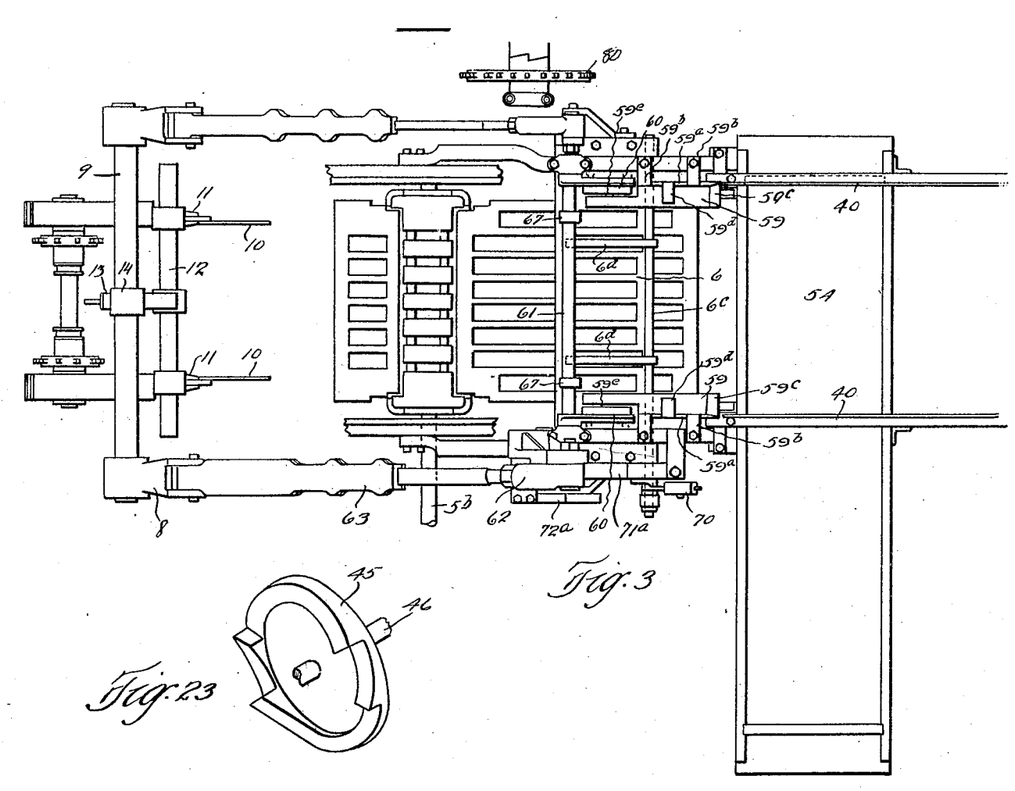
Fig. 3 is a plan view of the mechanism for turning the mold and feeding the same beneath the dies and means for conveying the filled mold to the endless chain.
Fig. 23 is a detail view of the cam for actuating the knocker.
Figure 4:
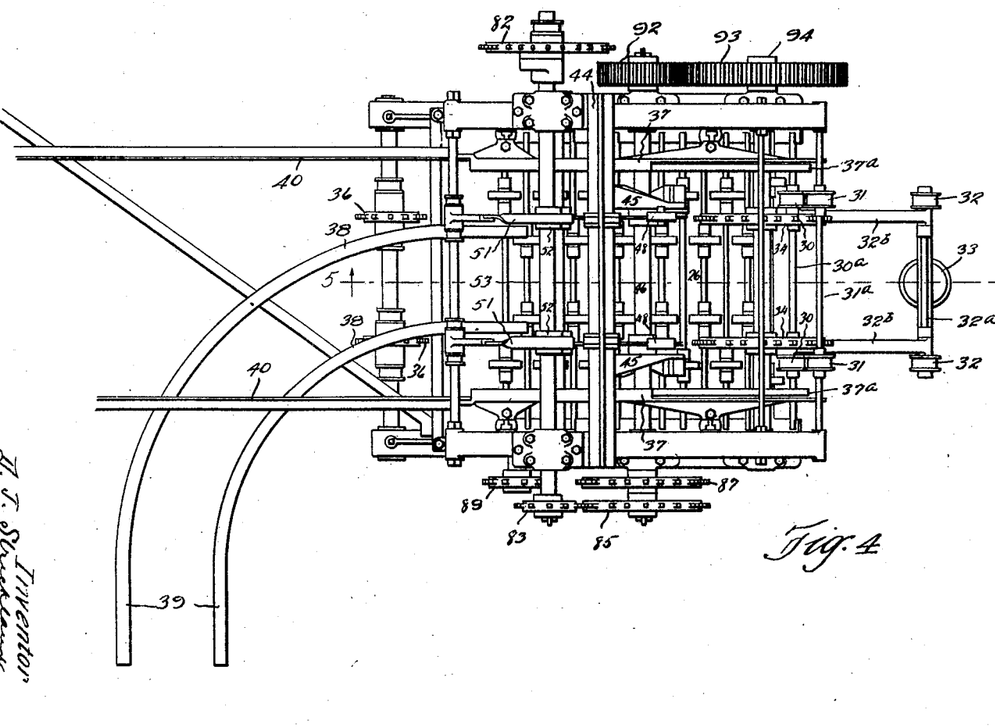
Fig. 4 is a plan view of the mechanism at the opposite end of the machine, said mechanism serving to invert, knock and empty the mold and carry off the bricks upon the pallet.
Figure 5:
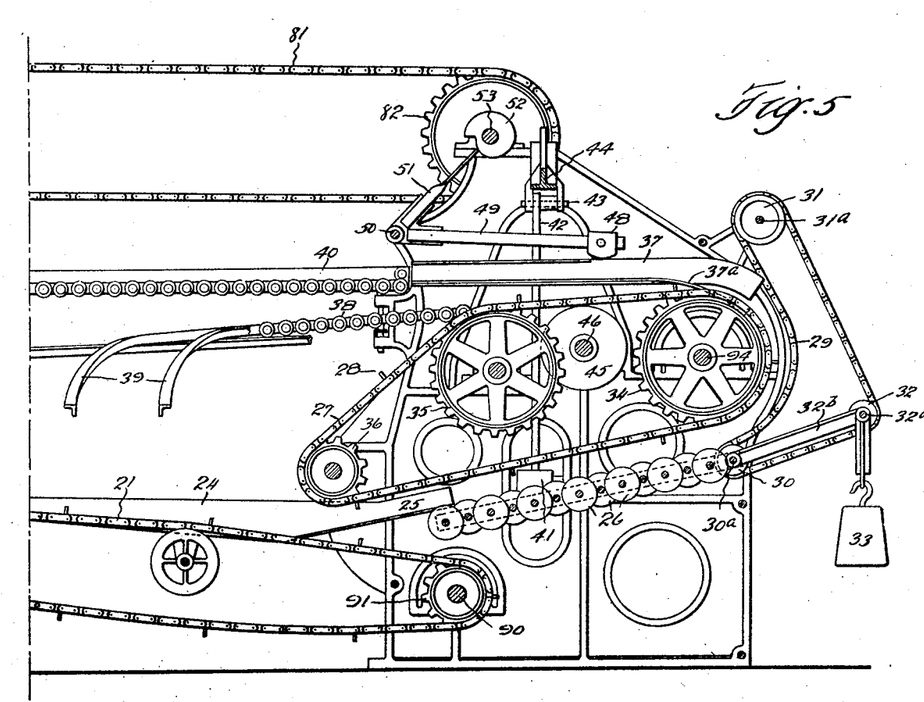
Fig. 5 is a sectional view partly in elevation taken on the line 5—5 of Fig. 4.
Figure 6:
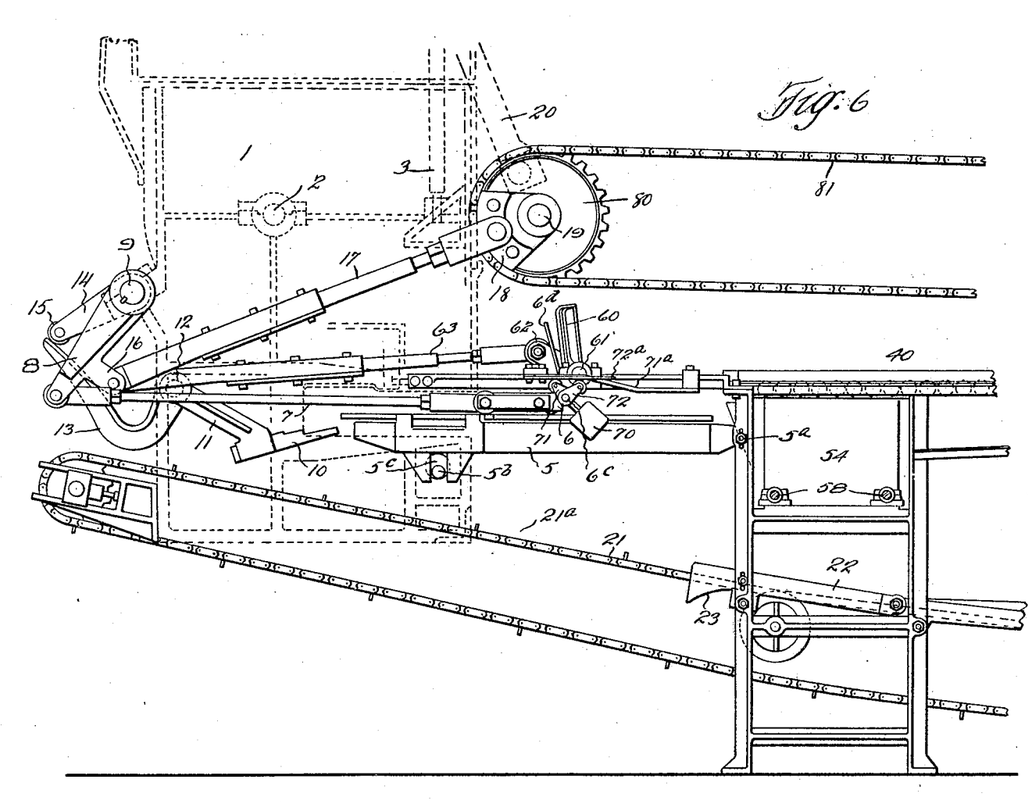
Fig. 6 is a view similar to Fig. 1 but showing the various parts in different operative positions.
Figure 7:
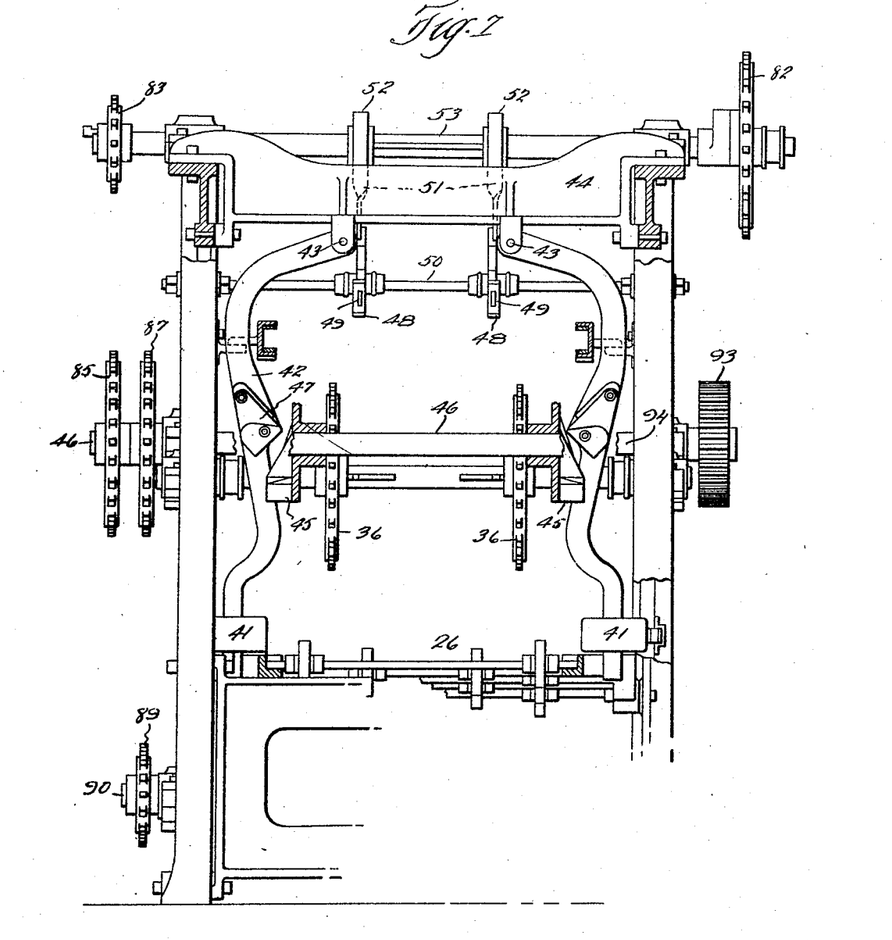
Fig. 7 is a transverse sectional view partly in elevation illustrating the mechanism for knocking the filled molds.
Figures 8, 9, 10:
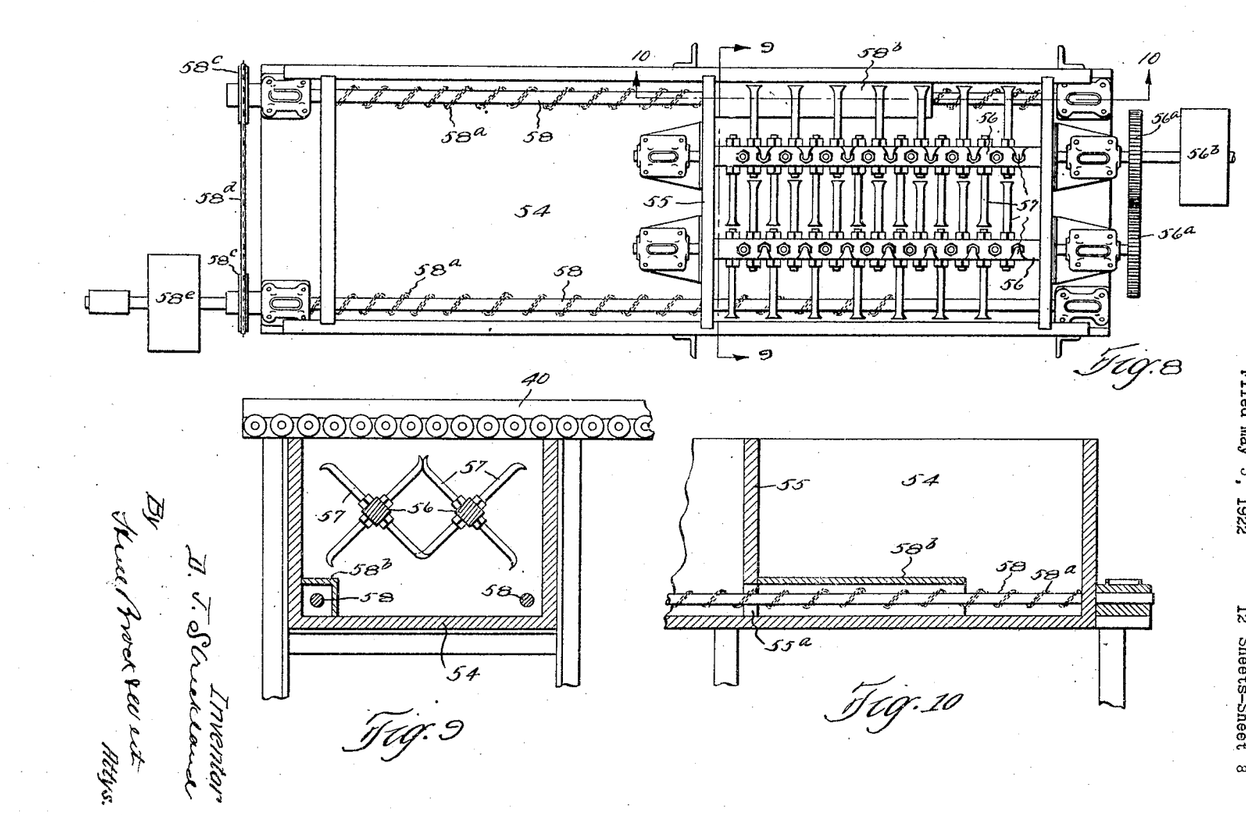
Fig. 8 is a plan view of the sanding mechanism.
Fig. 9 is a sectional view on the line 9—9 of Fig. 8
Fig. 10 is a sectional view on the line 10—10 of Fig. 8.
Figure 11:
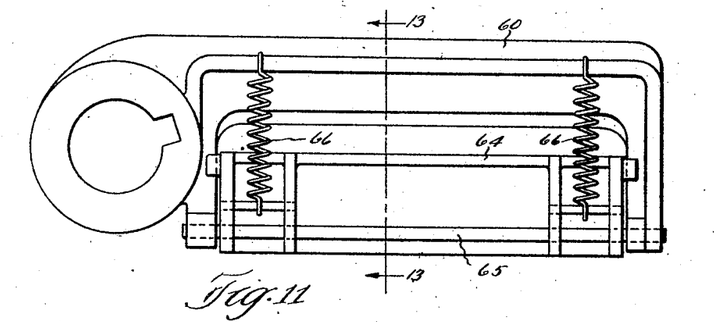
Fig. 11 is a side elevation of one of the arms or frames employed in reversing the mold and Fig. 12 is a detail perspective view of the same.
Figure 12:
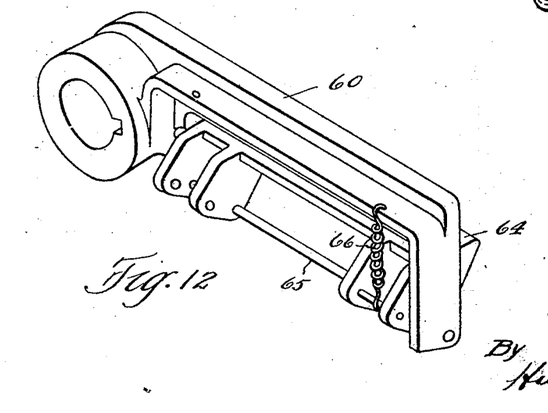

The roller track 40 extends over the sand box 54 suitably supported in the frame of the structure and during the passage of the inverted molds across the top of the sand box, the mold is thoroughly sanded by sand being rapidly thrown upwardly into the inverted mold. The sand box is divided into two compartments by means of vertical partition 55 and in one compartment I arrange the oppositely rotating shafts 56 carrying the sand throwing arms 57, the shafts 56 having gears 56ª mounted upon their outer ends, and one of the shafts is extended and has a drive pulley 56ᵇ connected thereto for the application of a belt for the purpose of rotating the sand throwing arms rapidly. The sand is deposited in the other compartment of the box and is fed into the compartment containing the sand throwing arms by means of shafts 58 arranged upon opposite sides in the sand box and extending the full length of both compartments as most clearly shown in Fig. 8, said shafts 58 having a chain 58ª or other form of feeding device wound spirally around the same so as to feed the sand into the compartment in which the sand throwing arms are arranged, there being openings 55ª at each side of the partition for the passage of the shafts and the sand, and it will be noted that the chain upon one shaft extends the entire length thereof whereas in the other it stops about midway the length of the sanding compartment, and at the side where the spiral feeding device extends the entire length of the shaft 58, I arrange a shield 58ᵇ extending about halfway up, this construction enabling the sand to be fed for the first half from one side, and for the second half, from the other side, and in this manner a complete and uniform supply of sand is provided.

Figure 13:
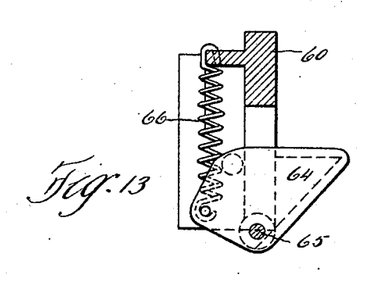
Fig. 13 is a section on the line 13—13 of Fig. 11 showing one position and Fig. 14 is a similar view showing another position.
Figure 14:
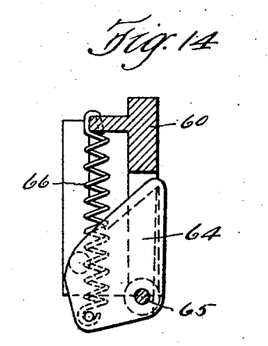
Figure 15:
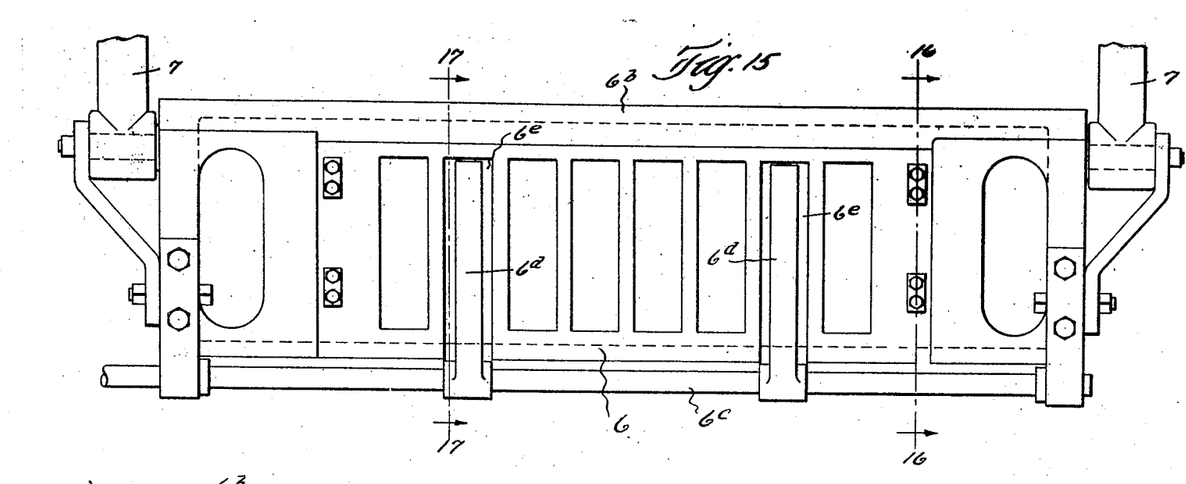
Fig. 15 is a plan view of the mold feeding carriage.
Figures 16, 17:
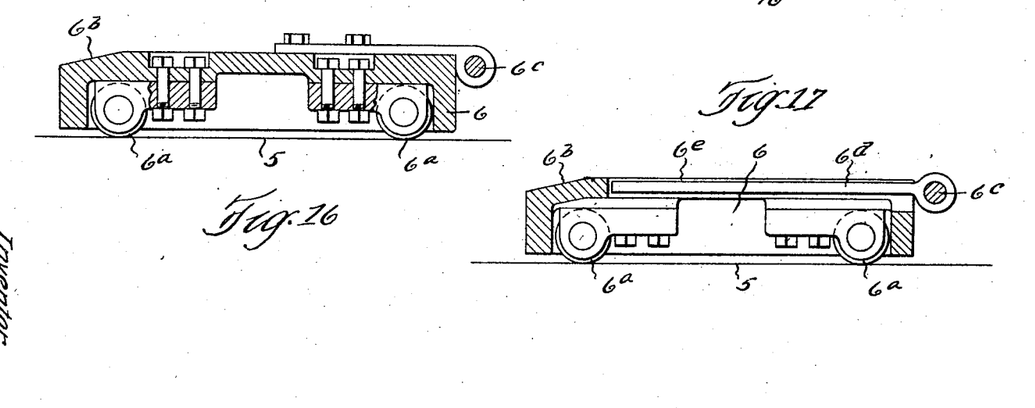
Fig. 16 is a section on the line 16—16 of Fig. 15
Fig. 17 is a sectional view on the line 17—17 of Fig. 15.

The shafts 58 extend beyond the sand box and are provided with sprockets 58ᶜ around which travels the chain 58ᵈ and one of the shafts is extended and provided with a pulley 58ᵉ by means of which power is applied to the sand feeding shafts. As the sanded mold emerges from the roller track 40 it passes on to a pair of oppositely disposed supports 59, each support having a side flange 59ª from which extend the supporting arms 59ᵇ and at their rear ends the support and flange are tapered as shown at 59ᶜ in order to guide the inverted mold on to the support, and an overhanging finger 59ᵈ maintains the mold in its proper position from the support. The forward end of each support is cut away, as shown at 59ᵉ, in order to accommodate the mold reversing arms 60 mounted upon a shaft 61, which shaft is rocked by means of a crank arm 62 connected to the end thereof, which arm 62 is in turn connected to a pitman 63 connected to and operating from the arm 16 actuated from the shaft 9. The reversing arms 60 are essentially in the form of an open frame within which are arranged the mold engaging fingers 64 pivoted upon a rod 65 journaled in the depending portions of the arm frame and having coiled springs 66 connected to said fingers and the arm for the purpose of normally projecting said fingers outwardly, as shown in Fig. 13, for the purpose of engaging the rabbetted shoulder 4ª of the mold 4, and as the lifting and reversing arm 60 is moved rearwardly to engage the mold, the fingers 64 are pressed inwardly as shown at Fig. 14 until after the shoulder has been cleared, and then the spring 66 will throw the fingers into engagement with the mold, and upon the forward and lifting movement of the arms 60 the mold will be carried with it and the forward edge thereof will contact with the eccentric collars 67 mounted upon the shaft 61 and serve to prevent an undue forward movement of the mold toward the mold receiving carriage 6, this carriage 6 moving back and forth upon the table 5, such movement being accomplished through the rods 7 connected to the ends of the carriage and also to the arm 16 operated from the shaft 9. The mold receiving carriage 6 is mounted upon rollers 6ª and is slightly tapered at its forward end as indicated at 6ᵇ. The carriage is also provided with a shaft 6ᶜ carrying the arms 6ᵈ which work in the slots 6ᵉ produced in the carriage, these arms 6ᵈ serving to receive the mold as it passes over the eccentric collars 67, and as the mold is just passing beyond these eccentric collars, the arms 6ᵈ are in an elevated position as shown in dotted lines in Fig. 18, gradually lower as the carriage moves rearwardly and eventually assume the horizontal position shown in Fig. 17 and then as the carriage moves to its complete rearmost position, as shown in Fig. 18, the mold is stripped from the carriage and drops upon the table and then is pushed forwardly upon the next forward movement of the carriage, such forward movement being indicated in dotted lines in Fig. 18.

Figure 18:
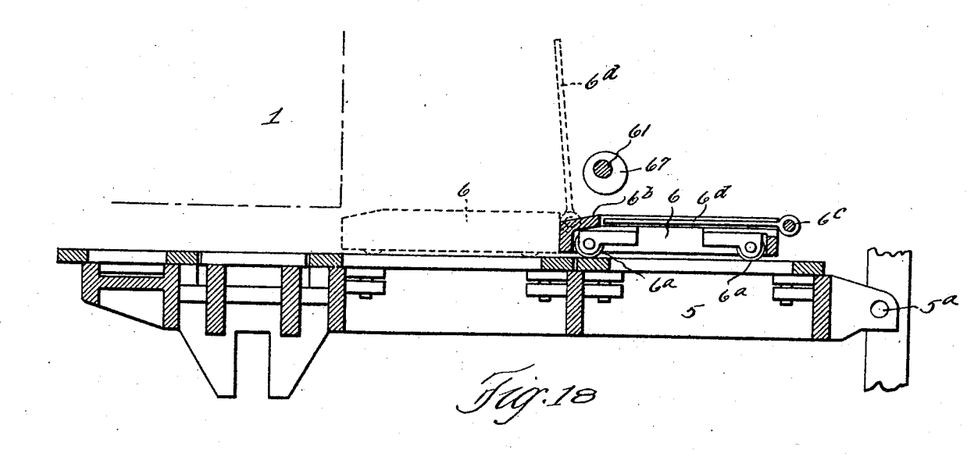
Fig. 18 is a sectional view illustrating the operative movements of said mold feeding carriage.
Figure 19:
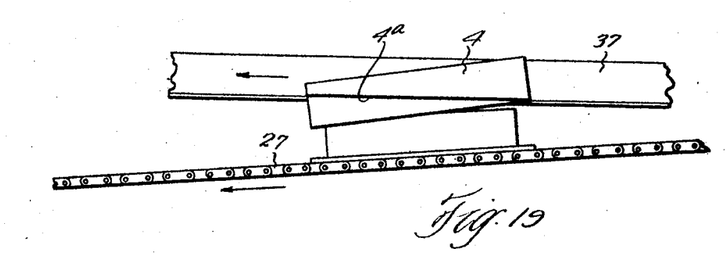
Fig. 19 is a view illustrating the manner of lifting the mold away from the pallet and bricks.
Figure 20:
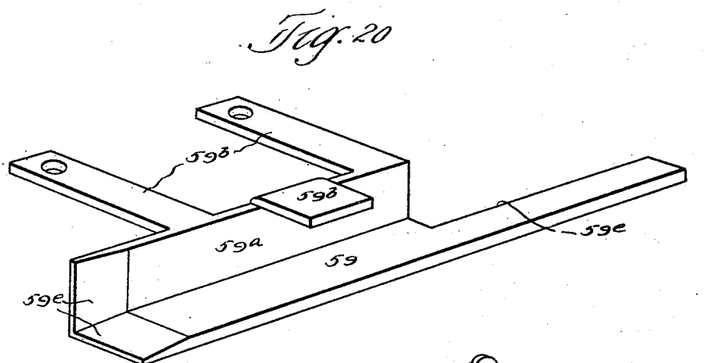
Figs. 20 and 21 show details of construction.
Figure 21:
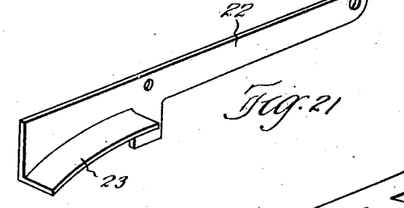
Figure 22:
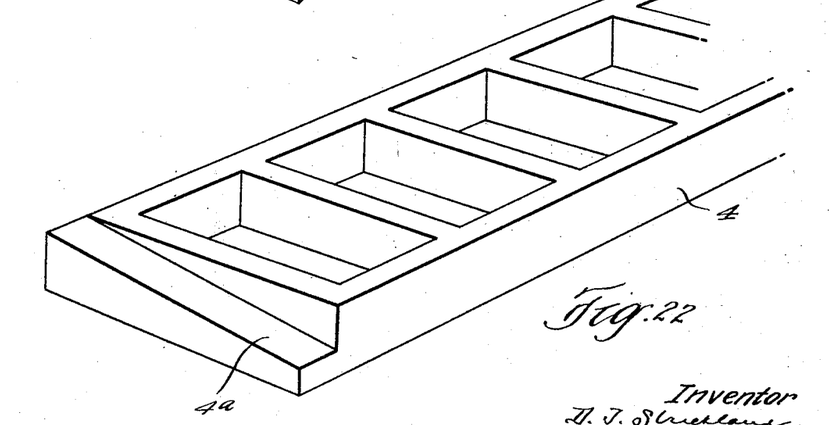
Fig. 22 is a detail perspective view showing one-half of the mold.

The shaft 6ᶜ extends laterally beyond the carriage at one side and is provided with an arm carrying a weight 70, the purpose of which is to turn the shaft and raise the arms as indicated in dotted lines in Fig. 18, and in order to insure the proper movement of the shaft and arms in case the weight 70 should fail to do so, I provide the extended end of the shaft 6ᶜ with two arms 71 and 72 each carrying a roller at its free end, and the roller of the arm 71 contacts with a strip 71ª which is horizontal at its extreme rear end and slightly inclined towards its forward end, the purpose of this strip being to prevent the weight turning the shaft until the proper time, and at which time the roller of the arm 71 has reached the inclined portion of said strip, and in case the weight and the engagement of the roller with the inclined portion of the strip should fail to actuate the shaft 6ᶜ, the engagement of the roller of the arm 72 with the strip 72ª will force the weight downwardly and consequently lift the arms 6ᵈ into their proper positions. The strips 71ª and 72ª are suitably supported at the side of the frame, and if desired, the strip 72ª can be formed of two or more spring leaves.

As previously stated, the sanded mold is lifted and reversed and deposited upon the carriage 6 and then as the carriage 6 recedes, the mold is pushed off of the forward end of the same and then at the next forward movement of said carriage, the mold is pushed along the table under the dies.

The table 5 is pivoted at 5ª and adjacent its forward end has a bearing upon the shaft 5ᵇ provided with eccentrics 5ᶜ and by adjusting this shaft 5ᵇ the exact and proper position of the table can be obtained.

It will thus be seen that I provide a novel construction of a device usable in connection with a brick making machine for the purpose of taking the filled mold away from the machine, inverting said mold so as to dump the bricks upon a pallet and carry said bricks and pallet off to one side while the empty and inverted molds are re-sanded, reversed and introduced beneath the brick making machine to receive another charge. It will be understood that power may be applied to the various parts of the mechanism in various ways and as one form I have shown a sprocket 80 mounted upon the shaft 19 which may be designated as the main power shaft. Sprocket 80 drives the chain 81 which in turn drives the sprocket 82 mounted on a shaft 53, and this shaft 53 also carries sprocket 83 which drives the chain 84 which passes around the sprocket 85 upon the shaft 46, and there is a second sprocket 87 upon this same shaft driving the chain 88 passing around sprocket 89 upon the shaft 90, and upon this shaft 90 is the sprocket 91 which drives the conveyor chain 21. Upon one end of the shaft 46 I provide a gear 92 which meshes with a gear 93 upon the end of the shaft 94 which is also the shaft upon which the sprockets 34 are mounted and which drive the chains 27 which effect the reversing and dumping of the mold. The dogs 47 are attached to the arms 42 and can be removed and replaced whenever they become worn or broken. The guide pieces 22 having the flanges 23 in addition to preventing the chain sagging also serve to arrest the molds at this point until the conveyor lug 21ª upon the conveyor chain 21 comes in contact with the mold so that the same will be carried rearwardly in a positive manner, and with the proper time movement so that all of the various operations to be had upon the mold can be accomplished in their proper sequence.

Having thus described my invention, what I claim is:

1. In a brick making machine, the combination with a reciprocating carriage, of a rock shaft carried by said carriage, mold receiving arms connected to said rock shaft, means for normally holding said arms elevated together with means for depressing said arms.

2. The combination with a reciprocating carriage having a rock shaft and arms connected to said rock shaft, said rock shaft being extended at one end, the carrying arms provided with rollers and strips 71ª and 72ª with which said roller arms engage for the purpose specified.

3. In a brick making machine, a sanding device comprising a box divided into two compartments, one compartment having rotating sand distributing means therein, and the other compartment having sand feeding means for feeding the sand into the first named compartment.

4. A sanding device for brick making machines comprising a box divided into two compartments, one of said compartments having rotary sand distributing means therein, the second compartment having rotary means for feeding the sand to the first named compartment, said means at one said extending halfway into the first named compartment, and the full length of said compartment at the opposite side of said compartment, said feeding device at this side having a shield extending halfway thereover.

5. In a brick making machine having inverted molds, a track upon which the inverted molds travel, supporting strips 59 upon which the mold is pushed from said track and means for engaging the mold while held upon said support, said means lifting and reversing said mold.

6. In a brick making machine, a track upon which an inverted and sanded mold travels, supports 59 for said mold, said supports being cut away at their forward ends lifting and reversing the arms working in said cut-out positions and adapted to engage the mold, and means for moving said arms whereby said mold is reversed and a carriage for receiving said mold so reversed.

7. In a brick making machine, a track upon which the inverted and sanded molds travel, a support for receiving said inverted mold, an adjustable table, a carriage movable thereon, and means operable with said carriage for reversing the mold and depositing the same upon said carriage.

8. In a brick making machine, a mold having an inclined rabbetted shoulder at each end thereof.

9. In a brick making machine, a table, a mold thereon, arms for receiving the mold from said table, a downwardly and rearwardly traveling conveyor upon which the mold is deposited, an upwardly and rearwardly extending conveyor adapted to reverse said mold, means for separating said mold from the pallet and bricks, means for sanding said mold, means for reversing said inverted mold and means for depositing said sanded and reversed mold upon the table.

In testimony whereof, I hereunto affix my signature.

DAVID J. STRICKLAND,